(12) United States Patent
Gambier et al.

(10) Patent No.: US 7,071,696 B2
(45) Date of Patent: Jul. 4, 2006

(54) MEASUREMENT DEVICE AND SUPPORT FOR USE IN A WELL

(75) Inventors: Philippe Gambier, Rosharon, TX (US); Emmanuel Rioufol, Rosharon, TX (US); Eric Veignat, Sugar Land, TX (US); Jose Teixeira, Chaville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 10/480,062

(22) PCT Filed: Jun. 12, 2002

(86) PCT No.: PCT/EP02/06441

§ 371 (c)(1),
(2), (4) Date: Dec. 8, 2003

(87) PCT Pub. No.: WO03/002850

PCT Pub. Date: Jan. 9, 2003

(65) Prior Publication Data

US 2004/0186665 A1    Sep. 23, 2004

(30) Foreign Application Priority Data

Jun. 26, 2001 (FR) .................... 01 08445

(51) Int. Cl.
*G01V 3/00* (2006.01)
*G01V 3/02* (2006.01)
*G01V 3/08* (2006.01)

(52) U.S. Cl. .................................... 324/347
(58) Field of Classification Search ............... 324/247, 324/323, 338, 332, 347, 354, 355, 357, 368; 175/50, 323, 320, 171, 257; 166/66, 65.1, 166/66.5, 242.9, 242.1; 73/152.57, 152.54; 343/719, 872, 873

See application file for complete search history.

(56) References Cited

U.S. PATENT DOCUMENTS 3,072,843 A * 1/1963 Clements et al. .......... 324/347
3,268,801 A * 8/1966 Clements et al. .......... 324/351

(Continued)

FOREIGN PATENT DOCUMENTS

CA          1326519          1/1994

(Continued)

*Primary Examiner*—Edward Lefkowitz
*Assistant Examiner*—Kenneth J. Whittington
(74) *Attorney, Agent, or Firm*—Victor H. Segura; Brigitte L. Echols

(57) ABSTRACT

The invention provides a support for measurement means for monitoring and/or studying a fluid reservoir (13) through which at least one well (11) passes, said support comprising: a cylindrical tube (2); and a jacket (3) surrounding said cylindrical tube. According to the invention, said jacket (3) has at least one recess (4, 5) for receiving means (6) for measuring a characteristic representative of said reservoir and/or connection means (7) leading to power supply and measurement-processing means (16). The invention also provides a measurement device for monitoring and/or studying a fluid reservoir (13) through which at least one well (11) passes, said device comprising: power supply and measurement processing means (16); means (6) for measuring a characteristic representative of said reservoir, and connection means (7) connecting said measurement means (6) to said power supply and measurement processing means (16). According to the invention, said device (10) being characterized in that it further comprises at least one support (1) according to any preceding claim, with said measurement means (6) and said connection means (7) being housed in the recesses (4, 5) in the jacket (3) of said support.

15 Claims, 3 Drawing Sheets

U.S. PATENT DOCUMENTS

| | | | |
|---|---|---|---|
| 4,241,789 A * | 12/1980 | Grosch | 166/241.7 |
| 4,286,217 A | 8/1981 | Planche | |
| 4,483,393 A * | 11/1984 | More et al. | 166/65.1 |
| 4,495,990 A * | 1/1985 | Titus et al. | 166/65.1 |
| 4,522,262 A * | 6/1985 | Perkins | 166/248 |
| 4,570,123 A * | 2/1986 | Grosso | 324/369 |
| 4,601,100 A * | 7/1986 | More et al. | 29/885 |
| 4,738,812 A | 4/1988 | Raynal | |
| 4,775,009 A | 10/1988 | Wittrisch | |
| 4,785,247 A * | 11/1988 | Meador et al. | 324/338 |
| 4,794,322 A * | 12/1988 | Davies | 324/347 |
| 4,912,415 A | 3/1990 | Sorensen | |
| 4,989,452 A | 2/1991 | Toon et al. | |
| 5,157,331 A * | 10/1992 | Smith | 324/338 |
| 5,214,384 A * | 5/1993 | Sprunt et al. | 324/351 |
| 5,233,304 A * | 8/1993 | Hubans | 324/323 |
| 5,303,773 A * | 4/1994 | Czernichow et al. | 166/66 |
| 5,334,801 A | 8/1994 | Mohn | |
| 5,642,051 A | 6/1997 | Babour et al. | |
| 6,004,639 A | 12/1999 | Quigley | |
| 6,480,000 B1 * | 11/2002 | Kong et al. | 324/338 |
| 6,525,540 B1 * | 2/2003 | Kong et al. | 324/338 |
| 6,554,064 B1 * | 4/2003 | Restarick et al. | 166/250.01 |

FOREIGN PATENT DOCUMENTS

GB    2146127    4/1985

* cited by examiner

MEASUREMENT DEVICE AND SUPPORT FOR USE IN A WELL

The invention relates to a support for measurement means, and more particularly to a support for measurement means for monitoring and/or studying a fluid reservoir having at least one well bored in geological formations passing therethrough.

The production of hydrocarbons needs to be controlled and monitored on a regular or permanent basis in order to determined the causes of any stoppage or reduction in production and in order to attempt to provide a remedy. Apart from the production means in place, production also depends on the characteristics of the geological formations (porosity, permeability, . . . ) and of the fluids they contain (water, oils, gas). In this respect, an important piece of information is the positions within the reservoir of the contact surface between hydrocarbons and water and between hydrocarbons and gas. It is essential not only to determine the levels of these contact surfaces when the well is put into place, but also at all times to know their current positions and movements so as to avoid water or gas reaching the production zone.

In conventional manner, the resistivity of terrain is used as a characteristic representative of the reservoir. The resistivity of hydrocarbons is generally much greater than the resistivity of water in a formation since such water carries a load of salt (the resistivity ratio is about 1 to 100). Document FR 2 712 627 describes a device enabling continuous measurement to be performed relating to a reservoir without affecting production, using means for measuring the potential difference between a measurement electrode fixed in the well and a reference electrode. That device presents, amongst other things, casing fitted to a production well and carrying electrodes on its outside wall, which electrodes are connected via contact pieces and wiring to electronic means also fixed on the outside of the casing. An electrical connection cable connected to a current source serves to connect the electronic means to the surface and runs along the casing. Cement is injected into the annular gap between the outside wall of the casing and the wall of the well so as to fix the device permanently in place, thereby making it possible to perform measurements without disturbing production.

Although it is very ingenious, that device presents various drawbacks coming mainly from the fact that the electrodes, the electronic means, and the electrical connection means are all installed on the outside of the casing. That disposition gives rise firstly to all of those elements running the risk of being damaged while they are being lowered down the well. The walls of wells are not accurately rectilinear and instruments for lowering items down a well are not always extremely accurate, so it can happen that the casing bangs into the wall. Under such circumstances, it is the more fragile devices, particularly the electrodes and the electronic means that are subjected to impact and that therefore run the risk of being seriously damaged or even made completely inoperative, which requires the casing to be raised back to the surface and the defective element to be replaced, where such an operation is lengthy and expensive.

Furthermore, that prior art device raises problems with cementing the casing to the walls of the well. Discontinuities in the outside profile of the casing as caused by the presence of the electrodes, the electronic means, and the connection wiring constitute risks of obtaining cementing in the annulus between the wall of the well and the wall of the device that is discontinuous. This leads to fluids from the rock formation infiltrating between the cemented annulus and the casing, thus damaging the casing and the measurement devices. Such discontinuities can also lead to a path being formed enabling such fluids to rise towards the surface, thereby not only damaging the equipment, but also endangering personnel in the vicinity of the well.

An object of the invention is thus to remedy those drawbacks by proposing a support for measurement means that is suitable for installing permanently in a well passing through a fluid reservoir while avoiding damage to said means and deficiencies in the cemented annulus.

To this end, the invention provides a support for measurement means for monitoring and/or studying a fluid reservoir through which at least one well passes, said support comprising:

a cylindrical tube; and a jacket surrounding said cylindrical tube.

According to the invention, said jacket has at least one recess for receiving means for measuring a characteristic representative of said reservoir and/or connection means leading to power supply and measurement-processing means.

In this manner, the support of the invention enables measurement means, electronic means, and connection means to be lowered down the well without said means projecting from the outside surface of the support as a whole. By housing these elements in recesses of a jacket they are protected from impacts while the support is being lowered down the well. Thereafter, the support of the invention possesses the advantage of presenting an outside surface that is substantially uniform, i.e. without projections, such that cementing can be performed uniformly in the annulus between said support and the walls of the well, thus avoiding all of the above-mentioned drawbacks.

In a preferred embodiment of the invention, the jacket is made of an electrically insulating material and the support includes a plurality of recesses that are regularly spaced apart to receive respective measurement means made of electrically conductive material. Advantageously, the measurement means comprise at least one measurement electrode, an electrode for injecting current into the reservoir and/or a current return electrode, thereby enabling an electrical parameter to be determined from which it is possible to deduce the characteristic that is representative of said reservoir.

In this way, it is possible for the support merely to house means for determining the potential difference between said measurement electrodes and a reference electrode, preferably situated on the surface, in order to be able to deduce the resistivity of the formations surrounding the reservoir and consequently the position of the contact surface between the hydrocarbons and water, and thus be able to optimize production.

In another embodiment, the support has an axial recess extending over the full length of said support, said recess being designed to receive the connection means.

This makes it possible in particular to avoid forming a leakage path for fluids coming from the formation and the reservoir and going towards the surface by following the path of the wire connection along the casing, as can happen in prior art devices. In addition, by matching the shape of the connection means accurately to that of the axial recess, and by a judicious selection of the material used, it is possible to obtain sealing that is entirely satisfactory in terms of preventing any fluid from moving along said connection means.

Advantageously, the support also includes a recess for receiving means for positioning said support in the well.

In this manner, all of the elements that are to be mounted on casing in the prior art can be positioned in recesses formed in the jacket of the support of the invention, thereby making it easier to lower the support down the well and ensuring that it can be cemented reliably when cement is injected between the walls of the support and of the well.

In an advantageous embodiment of the invention, the jacket surrounding the cylindrical tube comprises:

a first layer of substantially constant thickness covering the walls of the cylindrical tube; and a second layer covering said first layer, and having the recesses formed therein, the thickness of said second layer being such that the outside shape of the support is substantially cylindrical.

This embodiment makes it possible to adapt the thickness of the second layer locally so that regardless of the dimensions of the elements that are housed therein the support has no projections on its outside surface, thereby avoiding any impacts on said elements and any defects in the cemented annulus.

The invention also provides a measurement device for monitoring and/or studying a fluid reservoir through which at least one well passes, said device comprising:

power supply and measurement processing means;

means for measuring a characteristic representative of said reservoir; and connection means connecting said measurement means to said power supply and measurement processing means.

According to the invention, the device further comprises at least one support, with said measurement means and said connection means being housed in the recesses in the jacket of said support.

Other advantages and characteristics of the invention appear in the following description, given with reference to the accompanying drawings, in which.

Figure 1:
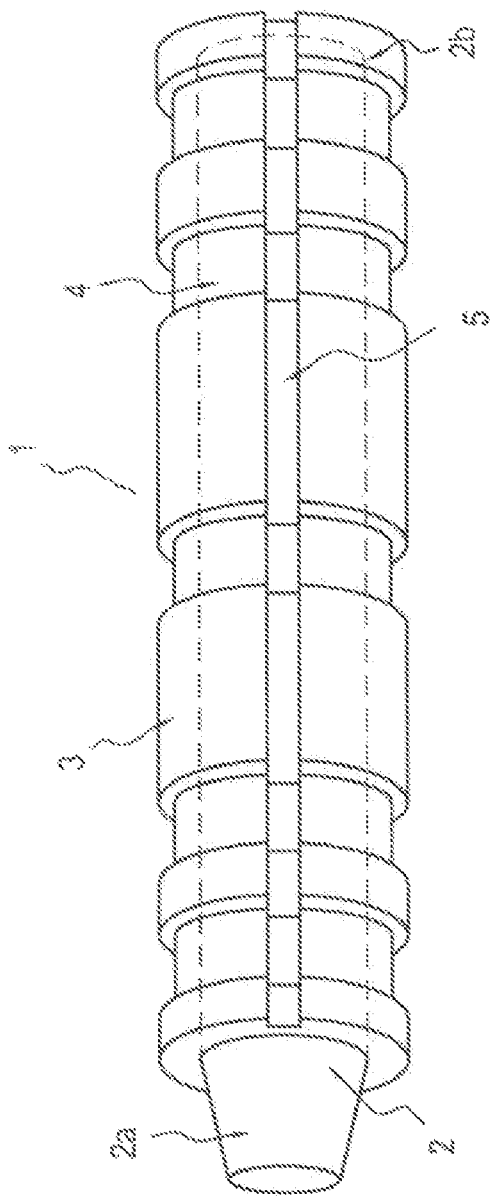
FIG. 1 is a view of an embodiment of a support of the invention.

As shown in FIG. 1, the support 1 of the invention is substantially cylindrical in shape, comprising a tube 2 having a first end 2*a* carrying a male threaded portion and a second end 2*b* carrying a female threaded portion. The tube 2 is advantageously made of metal. By means of these threaded ends, the support 1 can be associated with other supports that are identical or with any other tubular structure so as to make up a succession of segments of an overall duct. The support 1 also comprises a jacket 3 covering substantially all of the tube 2, except for its threaded male connection end. In another embodiment, the support 1 can be associated with other structures by being welded thereto.

As described below with reference to FIG. 3, the support of the invention is intended specifically to constitute a segment of casing covering the wall of a well passing through geological formations. The number of segments constituting said casing thus depends on the length of the well, said segments optionally all being constituted by supports of the invention or only a small number of them being constituted by such supports, with the other tubular segments having no jackets and no recesses. Where appropriate, the annulus between the casing formed in this way and the walls of the well is subsequently cemented so as to consolidate the assembly and isolate said casing from the fluids flowing in the terrestrial formations. In another application of the support of the invention, the assembly comprising at least one support 1 and a plurality of other segments constitutes part of production tubing, lowered inside casing covering the walls of a well (itself optionally including at least one support of the invention) and conveying a flow of effluent coming from a fluid reservoir through which the well passes.

In the example shown in FIG. 1, the jacket 3 comprises at least one, and advantageously a plurality of annular and/or axial recesses 4. The axial recess(es) 5 extend along the entire length of the support 1. These recesses can be covered in an optionally continuous sealing layer so as to further reduce the risk of fluid infiltrating between said axial recess and the wire connection that is to be installed therein. In this example, the recesses 4 are annular, however in general terms the jacket 3 has recesses of arbitrary shape given that said shapes need to correspond to the shapes of the measurement means, positioning means, etc. that are to be engaged in this way in said jacket. As explained in greater detail with reference to FIG. 2, the purpose of the jacket 3 is to receive various measurement means or electrical, electronic, optical, or hydraulic connection means so that said means are fully included within the thickness of said jacket and therefore do not stand proud, being no more than flush relative to the overall outside diameter of the support of the invention. Over the cylindrical surface of the support 1 as a whole, the depth of the recesses 4 or 5 can therefore vary locally as a function of the dimensions of the elements they are to receive, the essential point being that all of these elements are received fully within the thickness of the jacket 3.

In an embodiment, the jacket 3 is constituted by two layers of different materials: a first layer of constant thickness covering the walls of the cylindrical tube 2, and a second layer of varying thickness in which the recesses are formed. The function of this second layer is, so to speak, to "equalize" the outside profile of the jacket 3 so that its outside diameter remains constant over the entire length of the support 1. The thickness of this second layer is thus a function of the depth of the recesses. In an embodiment, the two layers of the jacket 3 can be eccentric so as to gain depth for the recesses and thus minimize the overall diameter of the support 1, depending on the particular elements that are to be positioned in said support. In another embodiment, which is easy to implement, the jacket 3 is made as a single layer in which recesses of various depths have been formed. In this manner, as mentioned above, while the support of the invention is being lowered down a well bored through terrestrial formations, it is the directly-exposed jacket 3 which is subjected to any impacts and friction, while the elements it carries remain protected. The jacket 3 is substantially cylindrical, but it could be eccentric relative to the axis of the cylindrical tube 2.

The mechanical properties of the jacket are advantageously selected so as to be capable of withstanding the weight of the elements installed in the recesses, and also the forces transmitted by the installation equipment (suspension jaws, protection sleeves, clamping jaws) used on the support while it is being lowered down an oil well. In this context, it is important to provide means for preventing damage to the jacket 3 not only while the support is connected via its threaded ends 2*a* and 2*b* to other supports or other tubular structures, but also while said support (or a succession of such supports) is being lowered down a well passing through at least one fluid reservoir. Solutions known in the state of the art can then be used such as using protection sleeves around the jacket 3 to prevent the teeth of the jaws of installing tools biting into said jacket, or it is possible to make direct use of jaws without teeth but provided with a covering that provides sufficient grip to enable the support 1 to be handled.

The mechanical properties of the jacket 3 can also be selected in such a manner as to increase the overall strength of the support 1, in particular its ability to withstand pressure, and this is particularly useful when the support of the invention is intended to constitute a segment of casing covering the walls of a well. The jacket 3 also needs to be mechanically strong when explosive charges are placed in the support 3 for the purpose of locally puncturing said support to enable hydrocarbons to flow in from the formation. Under such circumstances, the placing of measurement means and wire connection(s) in the support needs to be arranged so as to ensure that exploding charges does not damage this equipment.

Advantageously, the electrical properties of the jacket are determined by the nature of the measurement that are to be performed. When the representative characteristic of the reservoir is the resistivity of the formations surrounding said reservoir, it is for the jacket, or at least the first layer of said jacket in the above-cited example, to be of a material that is electrically insulating so as to avoid interfering with the measurement means to be positioned in the various recesses 4 and 5, and in particular so as to avoid short-circuiting them.

Finally, the chemical properties of the jacket 3 must also be selected so as to enable it to withstand the corrosive medium in which the support 1 is to be installed, in particular down an oil well. Satisfactory results have been obtained for a jacket 3 made of composite material (e.g. mixture of glass and epoxy), but it is also possible to envisage using other materials such as ceramic or various thermoplastic coverings.

Figure 2:
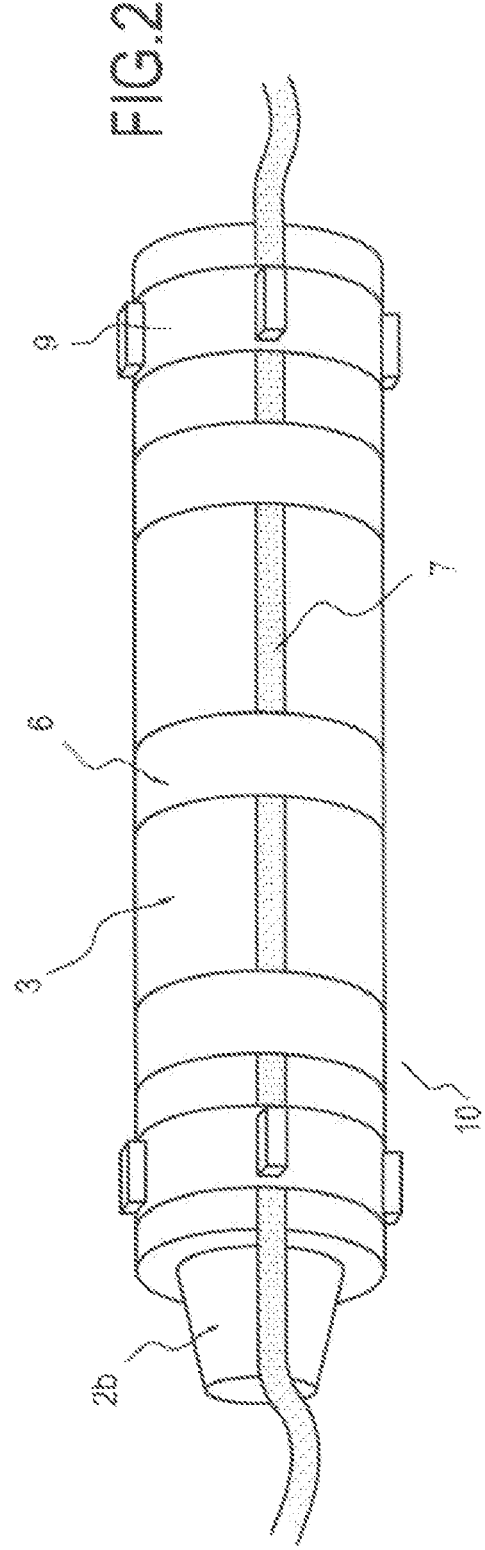
FIG. 2 is a diagrammatic view of an embodiment of a measurement device constituting an embodiment of the invention.

FIG. 2 shows a measurement device 10 of the invention comprising at least one support 1 of the invention having its recesses fitted with various elements. In one embodiment, a fraction of the recesses 4 are provided with annular measurement electrodes 6. The number of such electrodes is arbitrary and depends on the type of measurement and/or the desired accuracy. Advantageously, these electrodes are constituted by rings of electrically conductive material (when the desire is to perform measurements of the resistivity of the formations surrounding the reservoir) selected so as to be compatible with the measurements to be made and the fluids that are present. Nevertheless, the electrodes 6 can be of any shape and of any suitable material. In particular, when the annulus between the device 10 and the walls of the well is not cemented, the electrodes 6 can be provided with flexible metal springs for ensuring electrical contact with the walls of said well. This is particularly advantageous when the annulus is filled with an oily mud that is electrically non-conductive. The electrodes are installed in the recesses 4 prior to the support being lowered down the well, and, as mentioned above, the recesses 4 are of dimensions such as to ensure that the said electrodes are no more than flush relative to the outside diameter of the jacket 3.

The measurement electrodes 6 are connected via at least one wire connection 7 to means for powering and processing measurements, which means are preferably situated on the surface. Electronic means for intermediate processing (not shown) can also be integrated in the support 1 and can perform initial treatment on the measurements prior to sending them to the surface. The wire connection is received in the axial recess 5. The power supply means are current feeder means when it is desired to perform "electrical" measurements, but it is also possible to use hydraulic, optical, etc, . . . feeder means as a function of the kinds of measurement performed by the means 6.

When the measurement device 10 comprises a plurality of supports of the invention connected end to end, the axial recess 5 can be extended over the entire duct built up in this way. For this purpose, it is advantageous for the recesses 5 of the support to coincide once the supports have been connected together so as to form a continuous axial recess enabling the wire connection 7 to be extended to the surface. It is also advantageous to provide annular recesses in the jacket 3 suitable for receiving clamping and sealing means (not shown in the interest of clarity) that hold the wire connection in the axial recess 5. In this manner, while the device 10 is being lowered down a well, these clamping means prevent fluids from infiltrating between the jacket 3 and the connection 7, which could damage the jacket and said connection, and which could disturb measurements.

In the embodiment shown in FIG. 2, the measurement electrodes comprise at least one electrode for injecting current into the formations surrounding the well, a current return electrode, and a measurement electrode, while a reference electrode (not shown) is preferably situated on the surface. In this manner, the device of the invention makes it possible to determine an electrical parameter (corresponding to the potential difference between a measurement electrode and the reference electrode) from which it is possible to deduce the resistivity of the geological formations surrounding the well, which resistivity decreases with increasing conductive fluid content in the formations, i.e. with increasing water content to the detriment of hydrocarbon content. It should be observed that other arrangement of current electrodes are possible, providing electric current flows in the formation. Thus, the measurement device 10 can be used to implement a measuring and monitoring method of the kind described in patent FR 2 712 627, the content of which is incorporated herein by reference.

The device 10 can also be fitted with auxiliary devices likewise received in recesses specially provided in the support 1 of the invention. Such devices can include in particular centralizers 9 as shown diagrammatically in FIG. 2 and known in the state of the art. Under such circumstances, the centralizers have portions that project from the jacket 3 so as to ensure that the device is properly positioned in a well. This is particularly advantageous when cement is injected into the annulus between the walls of the well and said device, after the device has been put into place. Centralizers serve to ensure that the cemented annulus is of more uniform thickness, thereby minimizing weak points in the annulus. The support 1 for the device 10 of the invention can also possess recesses fitted with pressure and temperature sensors or sensors for any other parameter it is useful to know when monitoring and operating the reservoir through which the well extends.

When the device of the invention is fixed permanently down a well, its technical characteristics become particularly pertinent. As already mentioned, the fact that the outside profile of the device is uniform, i.e. free from any projections other than the centralizers, ensures not only that the various measurement means are protected while the device is being lowered into the well, but also guarantees the integrity of the cemented annulus.

Figure 3:
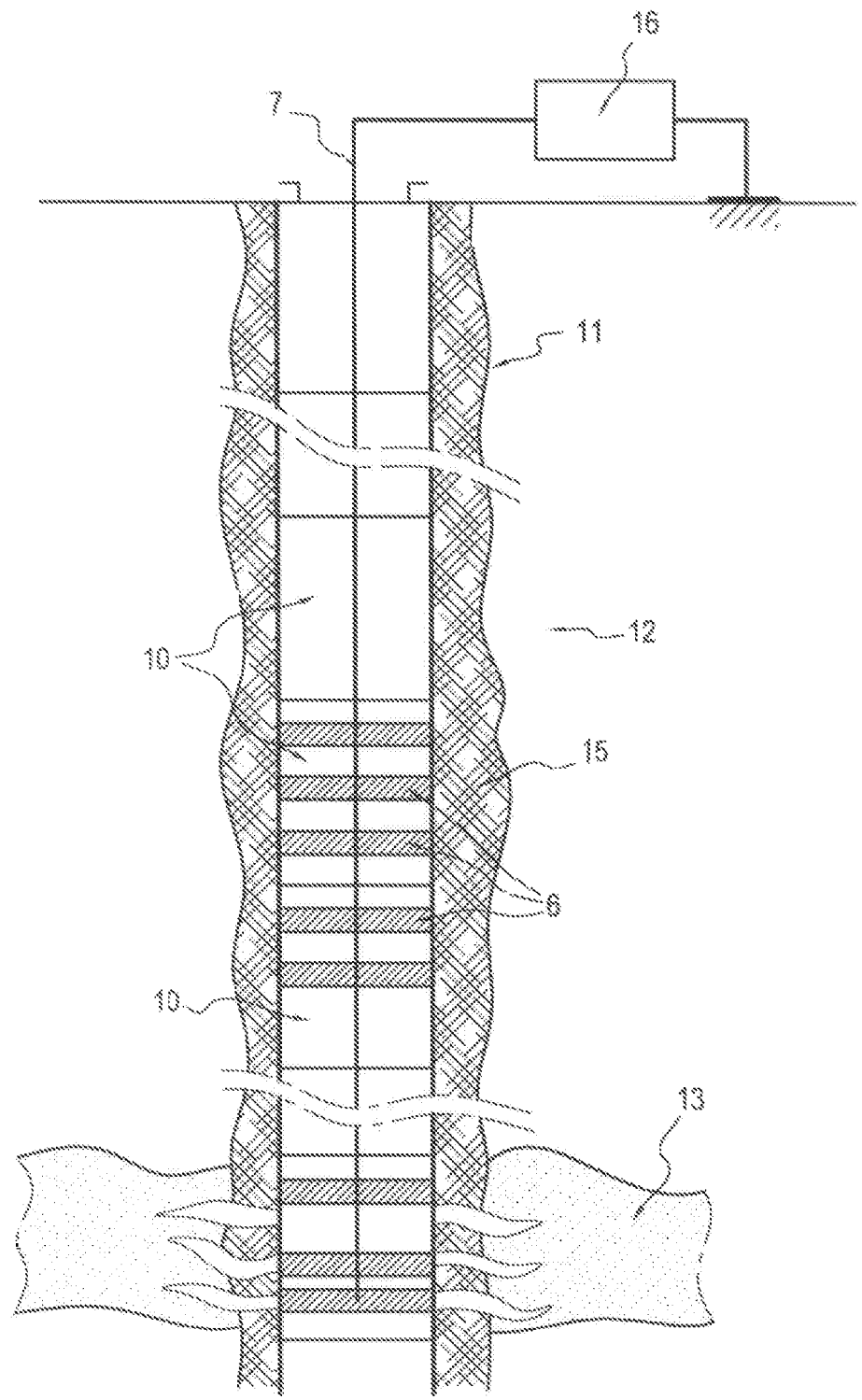
FIG. 3 is a diagram showing an example of an application of the FIG. 2 measurement device.

FIG. 3 is a diagram showing how a measurement device of the invention can be used. A well 11 is bored through terrestrial formations 12 and passes through at least one fluid reservoir 13. Casing has been lowered down the well 11 and the annulus 15 between said casing and the walls of the well has been cemented. The casing comprises a succession of segments constituted by measurement devices 10 of the invention, interconnected end to end via the threaded ends 2a and 2b of each support 1. At least one of the devices 10 has measurement electrodes 6, and each of the devices 10 has a recess for receiving a wire connection 7 taking the data picked up by the electrodes to means for processing the measurements and for supplying power, which means 16 are situated on the surface. This makes it simple to implement a method of monitoring and measuring data characteristic of the formations surrounding the well, as described in patent FR 2 712 627, while preserving the measurement means which remain permanently down the well and which it is therefore important to avoid damaging, and while also preserving the integrity of the cemented annulus 15 so as to prevent infiltration of fluid from the reservoir 13 or from formations between said annulus and the casing.

Figure 4:
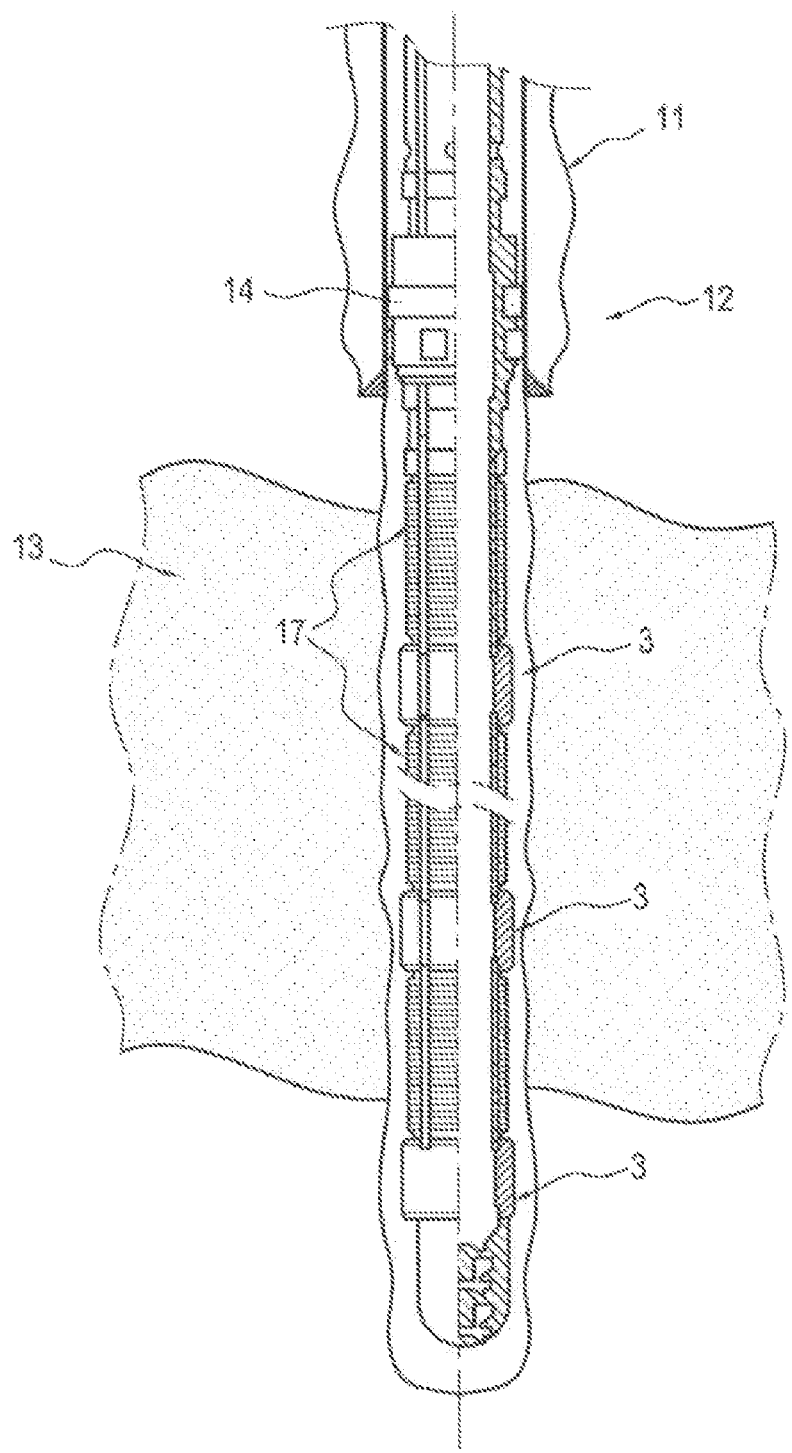
FIG. 4 is a view of another embodiment of the support of the invention.

FIG. 4 represents another implementation of the support according to the invention. A well 11 is bored through geological formations 12 and passes through at least one reservoir 13. A casing has been lowered in said well. The annulus between a first part of said casing and the walls of the well has been cemented until some liner hangers 14 that isolate a last part of the casing from the first cemented part. This last part of the casing is made of several supports according to the invention.

In one example of realization, the annulus between said last part and the wall of the well has been filled by gravel packs. For each of those supports, the cylindrical tube 2 comprises at least two sandscreens 17 between which the jacket 3 has been installed. This jacket comprises at least one annular recess, not visible on the figure, wherein one annular electrode has been installed. The measurement of the resistivity of the geological formations surrounding the borehole is thus realized through the plurality of annular electrodes each of those being embedded in the annular recess of corresponding support, installed between corresponding sandscreens.

The invention claimed is:

1. A support for measurement means to be permanently installed in a well in order to monitor and/or study a fluid reservoir through which said well passes, said support comprising a cylindrical tube and a jacket surrounding said cylindrical tube, whereby said jacket comprises:
   at least one recess for receiving means for measuring the resistivity of the geological formations surrounding said reservoir, and
   at least one axial recess for receiving connection means leading to power supply and measurement-processing means, said axial recess being such that said connection means are flush with the external surface of said jacket and said axial recess extending over the entire length of the support.

2. The support of claim 1, wherein the jacket is made of electrically insulating material.

3. The support of claim 2, further comprising a plurality of recesses that are regularly spaced apart and designed to receive respectively measurement means of electrically conductive material.

4. The support of claim 3, wherein the measurement means comprises at least one measurement electrode and at least a member selected from the group consisting of an electrode for injecting current into the reservoir, and a current return electrode, said measurement means enabling an electrical parameter to be determined from which it is possible to deduce the resistivity of the geological formations surrounding said reservoir.

5. The support of claim 1, further including a recess for receiving positioning means for positioning said support inside the well.

6. The support of claim 1, wherein the jacket surrounding the cylindrical tube comprises:
   a first layer of substantially constant thickness covering the walls of the cylindrical tube; and
   a second layer covering said first layer, and having the recesses formed therein, the thickness of said second layer being such that the outside shape of the support is substantially cylindrical.

7. The support of claim 6, wherein the first layer is made of electrically insulating material.

8. The support of claim 1, wherein the ends of the cylindrical tube comprise connection means for connecting said support to a second cylindrical tube and/or to a second support.

9. The support of claim 1, wherein the cylindrical tube comprises at least two sandscreens surrounding the jacket.

10. A measurement device to be permanently installed in a well for monitoring and/or studying a fluid reservoir through which at least one well passes, said device comprising:
    electrical power supply and measurement processing means;
    means for measuring the resistivity of the geological formation surrounding said reservoir;
    connection means connecting said measurement means to said electrical power supply and measurement processing means; and
    at least one support for measurement means to be permanently installed in a well in order to monitor and/or study a fluid reservoir through which said well passes, said support comprising a cylindrical tube and a jacket surrounding said cylindrical tube, whereby said jacket comprises:
    i. at least a first recess for receiving means for measuring the resistivity of the geological formations surrounding said reservoir, and
    ii. at least an axial recess for receiving connection means leading to power supply and measurement-processing means, said axial recess being such that said connection means are flush with the external surface of said jacket
    and whereby said measurement means and said connection means are being housed in the first and axial recesses in the jacket such that said measurement and connection means are flush with the external surface of said jacket and said axial recess extending over the entire length of the support.

11. The device of claim 10 permanently installed in the well by cement injected between said device and the walls of the well.

12. The device of claim 10, wherein the jacket is made of electrically insulating material.

13. The device of claim 12, further comprising a plurality of recesses that are regularly spaced apart and designed to receive respectively measurement means of electrically conductive material.

14. The device of claim 13, wherein the measurement means comprises at least one measurement electrode and at least a member selected from the group consisting of an electrode for injecting current into the reservoir, and a current return electrode, said measurement means enabling an electrical parameter to be determined from which it is possible to deduce the resistivity of the geological formations surrounding said reservoir.

15. The device of claim 14, permanently installed in the well by cement injected between said device and the walls of the well.

* * * * *